Sept. 20, 1932.  J. E. FOSTER  1,878,124
THERMIONIC SYSTEM
Original Filed Jan. 8, 1925
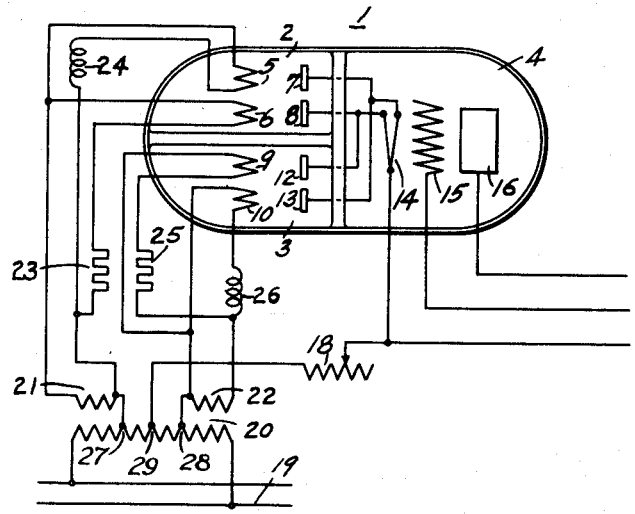
INVENTOR
Julius E. Foster
by George E. Mueller
ATTY.

Patented Sept. 20, 1932

1,878,124

UNITED STATES PATENT OFFICE

JULIUS E. FOSTER, OF PITTSBURGH, PENNSYLVANIA, ASSIGNOR TO RADIO CORPORATION OF AMERICA, A CORPORATION OF DELAWARE

THERMIONIC SYSTEM

Original application filed January 8, 1925, Serial No. 1,182. Divided and this application filed June 5, 1929.
Serial No. 368,686.

This application is a division of my application relating to thermionic devices, filed January 8, 1925, Serial No. 1,182.

This invention relates in general to electronic devices and to systems whereby such devices may be utilized to rectify alternating currents, for general application, but particularly for radio applications where a uniform or constant current is desired.

The primary object of my invention is to provide a rectifying system and an electronic device that may be suitably energized therefrom, by energy derived from a source of alternating current such as the usual light and power circuit generally available.

Another object of my invention is to provide an improved system for obtaining rectified current of substantially uniform or constant value that may be suitable for application in radio circuits.

In the parent application, Serial No. 1,182, filed January 8, 1925, of which this is a division, I have described an electronic device embodying a rectifying unit of special construction whereby proper and complete rectification of an alternating current may be effected, to provide a source of substantially constant direct current or direct current energy for the energization of a cathode element in a 3-element tube.

The feature of importance that is involved in the construction of that rectifier unit is that the filamentary electrodes of a double-wave rectifier must be properly arranged and separated, or isolated, to prevent current leakage between the active zones around those filaments, if proper rectification of the alternating current is to be obtained, and short circuiting of the associated transformer is to be avoided.

Insofar as the teaching of the parent application in that direction may be applicable to the inventions disclosed herein, it is desired that such teaching be considered as a part of the present application.

The nature of the operation of a radio receiving set, is such that small variations in energizing current, or applied energy, are considerably magnified. It is therefore desirable that the rectifying system, whereby the usual available alternating-current energy is rectified to direct-current energy, shall be such as to reduce to a minimum the variation or ripple in the resultant rectified direct current, which usually manifests its presence by the well known hum. If such resultant energy can be maintained substantially constant, any distortion that might be introduced into the receiving circuit will be considerably minimized.

In the usual rectifying circuits or systems, the positive and negative waves of an alternating current are caused to assume the same cumulative relationship whereby all of the current waves are caused to traverse a predetermined load circuit in the same direction, thereby establishing the effect of a direct current. Because of the spaced relationship and the sinusoidal character of the energy effects of the waves, however, even when both waves are rectified, the resultant current presents a varying direct current effect similar to the super-imposition of an alternating current upon a constant uniform direct current.

It is one of the objects of this invention to provide rectifying systems wherein the varying effect in the resultant current is considerably diminished.

Rectification of alternating current is usually effected by transmitting all of the waves of one polarity in succession thru a uni-directional current conducting medium. Due to their electrical spacng such waves substantially constitute successive spaced energy impulses. Between such energy impulses of that polarity, no energy is ordinarily transmitted by the individual current conducting medium. Where the waves of both polarities are rectified, the waves of the other polarity are also transmitted through a uni-directional current-conducting medium and combined with the waves of the first polarity in a cumulative sense. Since the energy impulses are alternately transmitted by the two conducting mediums, however, and then combined in a single conducting medium, which is the load circuit, the space interval between the energy impulses of one polarity are filled to a great extent by the energy impulses of the other polarity.

In order to provide a better rectification characteristic, however, I modify the operation of each uni-directional current conducting medium in such manner as to supplement the energy impulses normally transmitted by it. During the transmission of the normal impulse through the conducting medium, an auxiliary energy impulse is stored in an auxiliary circuit. During the normally inactive intervals between the normal energy impulses, the stored energy impulses are supplied to the load circuit. Since the normal energy impulses are transmitted by the two conducting media or paths alternately, the accumulation of the normal and auxiliary energy impulses in the load circuit tends to establish a substantially constant direct current effect.

The result of the ultimate rectified current made up of the two substantially constant current impulses transmitted by each path is relatively free of variations and less likely to produce a humming effect.

In one modification of this invention which I have described and claimed in another divisional co-pending application, Serial No. 368,685, filed June 5, 1929, I utilize a double-wave rectifier for transmitting the normal energy impulses from an alternating current circuit, as rectified current, to the filament of an audion which constitutes the load circuit. I also provide a condenser circuit in shunt with each rectifying path so that the condenser will be energized during the transmission of current by the associated rectifier path. When the current is not transmitted by the rectifier path, the condenser discharges its stored energy into the load circuit. In that modification the supplemental energy is stored in the condenser circuit in shunt with the rectifier path and in series with the load circuit.

In the present modification, I obtain the result of overlapping energy impulses in greater cumulation than by the ordinary double-wave rectifier, by means of a rectifier with a plurality of cathodes energized from an alternating current supply circuit, through a phase-splitter. By means of the phase-splitter the current impulses derived from the supply circuit are subdivided and then supplied to the respective cathodes in out-of-phase or overlapping relationship whereby the duration of the transmitting interval or period of the rectifier path is considerably increased.

In ordinary double-wave rectification only two current or energy impulses per cycle are supplied to the direct current circuit, corresponding to the positive and the negative current waves. If the number of energy impulses were increased per cycle the sinusoidal character of the impulses would be compensated for and the resultant direct current would be ordinarily substantially constant in value.

When a double-wave rectifier arrangement is employed, and the current transmitting paths for the waves of each polarity are provided in similar manner with a plurality of cathodes and a phase-splitting device, a greater number of overlapping energy impulses are obtained by the sub-dividing effect of the phase-splitter and the resultant rectified current established by the re-combining of the sub-divided impulses is much more nearly constant in value than the usual rectified current made up only of two waves per cycle.

By means of the split-phase arrangement, the number of energy impulses per cycle transmitted by the rectifying paths to the load circuit is increased, and the resultant direct current is thus made more nearly substantially constant in value with a consequent diminution in the wave or ripple.

The accompanying drawing illustrates diagrammatically a simple split-phase circuit arrangement whereby the number of impulses per cycle supplied to the load circuit from the alternating current supply circuit may be increased.

As is illustrated in the drawing an electronic device 1 comprises two rectifying units 2 and 3 and an amplifying unit 4. The rectifying unit 2 is illustrated as comprising two filaments 5 and 6 as cathodes and two plates 7 and 8 as anodes. The rectifying unit 3 similarly comprises two filaments 9 and 10 as cathodes and two plates 12 and 13 as anodes. The amplifying unit comprises the usual filament 14 a grid 15 and a plate 16.

The plates or anodes 7 and 13 of the rectifying units are joined and connected to one terminal of the filament 14. The plates or anodes 8 and 12 of the rectifying unit are connected and joined to the other terminal of the filament 14. The mid-point of the filament 14 is connected through a resistor 18 to the neutral point 29 of the transformer 20.

Energy for the device is derived from an alternating current circuit 19 such as the usual light and power circuit, and is transformed to the desired voltage by means of the transformer 20, after which it is rectified and utilized by the device as illustrated. The filaments 5 and 6 of the rectifying unit 2 are maintained energized by energy derived from a secondary winding 21 of the transformer 20. The filaments of the rectifying unit 3 are similarly maintained energized by a secondary winding 22 of the transformer 20.

In order that the energy impulses supplied to the filaments 5 and 6 for transmission through their common path may be properly displaced in phase relationship to obtain the desired overlapping, the filaments 5 and 6 are energized through a phase-splitter comprising a resistor 23 and a reactor 24. The filaments 9 and 10 of the rectifying unit 3 are similarly energized through a phase-splitter comprising a resistor 25 and a reactor 26.

One point of each secondary winding 21 and 22 is connected respectively to points 27 and 28 of the primary winding, equally spaced from the mid-point 29, on the primary winding, which serves as an artificial neutral point for the rectifying system. To complete the circuit of the rectifying system the mid-point of the filament 14 of the amplifying unit 4 is connected to the artificial neutral 29 through a resistor 18.

Due to the inductive nature of the reactors 24 and 26 in the phase-splitters, the currents traversing these inductive circuits, and, consequently, the filaments included therein, are in lagging phase relationship with respect to the currents traversing the non-inductive resistors 23 and 25 and their associated filaments 6 and 9 respectively.

When an energy impulse or current wave is transmitted by the transformer to each rectifying unit, the energy impulse is subdivided by the phase-splitter to be supplied to each of the filamentary cathodes of that unit. The current wave or impulse in the non-inductive branch of the phase-splitter is transmitted first, while the energy in the inductive branch of the phase-splitter is stored as electro-magnetic energy. After a time interval depending upon the electrical constants of the inductive branch circuit, the stored energy in that circuit is supplied to its filament for transmission through the rectifying path. Due to the lagging character of the impulse transmitted by the inductive circuit of the phase-splitter there is an overlapping between the two sub-divided impulses transmitted by the two filaments of the rectifier unit and the aggregate ultimate impulse is modified from a sinusoidal wave or half cycle impulse to an enlarged impulse extending over a time interval greater than the usual half cycle.

Since both rectifier units in combination with their phase-splitting devices function in the same manner, the number of impulses transmitted by both rectifier units exceed the usual two-waves per cycle, and the resultant aggregate, or direct, current tends to assume a more nearly constant value with less of a ripple or variation in that value.

Consequently, by means of a phase-splitting arrangement such as is illustrated the number of energy impulses per cycle is increased over the number of current-waves directly obtained from the alternating current circuit, and the resultant rectified current is rendered more nearly substantially constant in value.

Although I have shown only two filaments and a phase-splitter including only a two-branched circuit, it will be obvious to those skilled in the art that this principle may be extended to increase the number of energy impulses for a definite electrical time interval.

Although the circuits are shown as applied to two separate portions of the filament 14, all of the rectifier plates may be connected together and all of the energy supplied from the respective rectifier filaments may be combined and transmitted through the filament 14 as one element.

My invention is not limited to the specific details of construction and arrangement as illustrated but may be variously modified without departing from the spirit and scope of the invention as set forth in the appended claims.

I claim as my invention:

1. In a rectifying system, the combination with an alternating current supply circuit and a direct current load circuit, of means for transmitting a rectified current from the supply circuit to the load circuit, said means comprising a rectifying device provided with a plurality of cathode elements, means for maintaining the cathode elements simultaneously energized, and means for supplying out-of-phase energy impulses to the several cathode elements.

2. In a rectifying system, the combination with an alternating current supply circuit and a direct current load circuit, of means for transmitting a rectified current from the supply circuit to the load circuit, said means comprising a rectifying device provided with a plurality of cathode elements, said cathode elements being included in separate alternating current circuits simultaneously energized from said alternating current supply circuit, and means included in each of the cathode circuits for supplying out-of-phase overlapping energy impulses to the respective cathode elements.

3. In a rectifying system, the combination with an alternating current supply circuit and a direct current load circuit, of means for transmitting a rectified current from the supply circuit to the load circuit, said means comprising a rectifying device provided with a plurality of cathode elements and a plurality of anode elements, means for maintaining the cathode elements simultaneously energized, means for supplying energy impulses to the cathode elements, and means for causing such energy impulses to maintain a time-spaced overlapping relationship.

In testimony whereof, I have hereunto subscribed my name this 4th day of June, 1929.

JULIUS E. FOSTER.